(12) United States Patent
Hofbauer

(10) Patent No.: US 8,783,015 B2
(45) Date of Patent: Jul. 22, 2014

(54) SHARED EGR SYSTEM AND METHOD FOR A DUAL-MODULE ENGINE

(71) Applicant: EcoMotors, Inc., Allen Park, MI (US)

(72) Inventor: Peter Hofbauer, West Bloomfield, MI (US)

(73) Assignee: EcoMotors, Inc., Allen Park, MI (US)

( * ) Notice: Subject to any disclaimer, the term of this patent is extended or adjusted under 35 U.S.C. 154(b) by 72 days.

(21) Appl. No.: 13/711,683

(22) Filed: Dec. 12, 2012

(65) Prior Publication Data

US 2013/0152547 A1    Jun. 20, 2013

Related U.S. Application Data

(60) Provisional application No. 61/576,057, filed on Dec. 15, 2011.

(51) Int. Cl.
| | | |
|---|---|---|
| *F02M 25/07* | (2006.01) | |
| *F02B 73/00* | (2006.01) | |
| *F01N 3/035* | (2006.01) | |
| *F01N 3/021* | (2006.01) | |
| *F01N 13/10* | (2010.01) | |
| *F02B 37/00* | (2006.01) | |
| *F02B 37/007* | (2006.01) | |
| *F01N 13/04* | (2010.01) | |

(52) U.S. Cl.
CPC ............... *F01N 3/035* (2013.01); *F02B 73/00* (2013.01); *Y02T 10/144* (2013.01); *F02M 25/07* (2013.01); *F01N 3/021* (2013.01); *F01N 13/04* (2013.01); *F01N 13/107* (2013.01); *F02B 37/001* (2013.01); *F02B 37/007* (2013.01)
USPC .................. 60/278; 60/274; 60/280; 60/285; 60/297; 60/299; 60/311; 60/324

(58) Field of Classification Search
USPC ........... 60/274, 278, 280, 285, 297, 298, 299, 60/311, 320, 324
See application file for complete search history.

(56) References Cited

U.S. PATENT DOCUMENTS

| | | | |
|---|---|---|---|
| 6,145,313 A | 11/2000 | Arnold | |
| 7,975,478 B2 * | 7/2011 | Zielke et al. ................. | 60/605.2 |
| 2004/0144080 A1 * | 7/2004 | Suzuki et al. .................... | 60/276 |
| 2007/0119171 A1 * | 5/2007 | Boyapati et al. ................ | 60/602 |
| 2010/0082192 A1 * | 4/2010 | Hofbauer ........................ | 701/22 |
| 2010/0293943 A1 | 11/2010 | Teng et al. | |
| 2010/0293944 A1 | 11/2010 | Hunter | |
| 2011/0023482 A1 * | 2/2011 | Styles et al. ................. | 60/605.2 |
| 2011/0072804 A1 * | 3/2011 | Van Nieuwstadt et al. ..... | 60/287 |
| 2011/0094224 A1 * | 4/2011 | Sheidler et al. .............. | 60/605.2 |
| 2011/0094486 A1 | 4/2011 | Vuk | |
| 2011/0232279 A1 | 9/2011 | Zielke et al. | |
| 2011/0265454 A1 * | 11/2011 | Smith et al. ..................... | 60/274 |

* cited by examiner

*Primary Examiner* — Thomas Denion
*Assistant Examiner* — Jorge Leon, Jr.
(74) *Attorney, Agent, or Firm* — Diana D. Brehob

(57) ABSTRACT

In systems in which there is insufficient pressure difference between the intake and the exhaust to drive the EGR, an EGR pump is provided. In a dual-engine system, disclosed herein, the EGR system, i.e., the EGR cooler and EGR pump, is shared to obviate the need for two of each. Shutoff valves may be provided between the EGR system and a secondary of the two engines to isolate the secondary engine when it is not operating. When the engines are OPOC engines, exhaust aftertreatment devices, such as diesel oxidation catalysts and/or diesel particulate filters, may be placed upstream of where the EGR gases tee off from the engine's exhaust to thereby maintain a high pressure ratio across an exhaust turbine located downstream in the engine's exhaust.

17 Claims, 2 Drawing Sheets

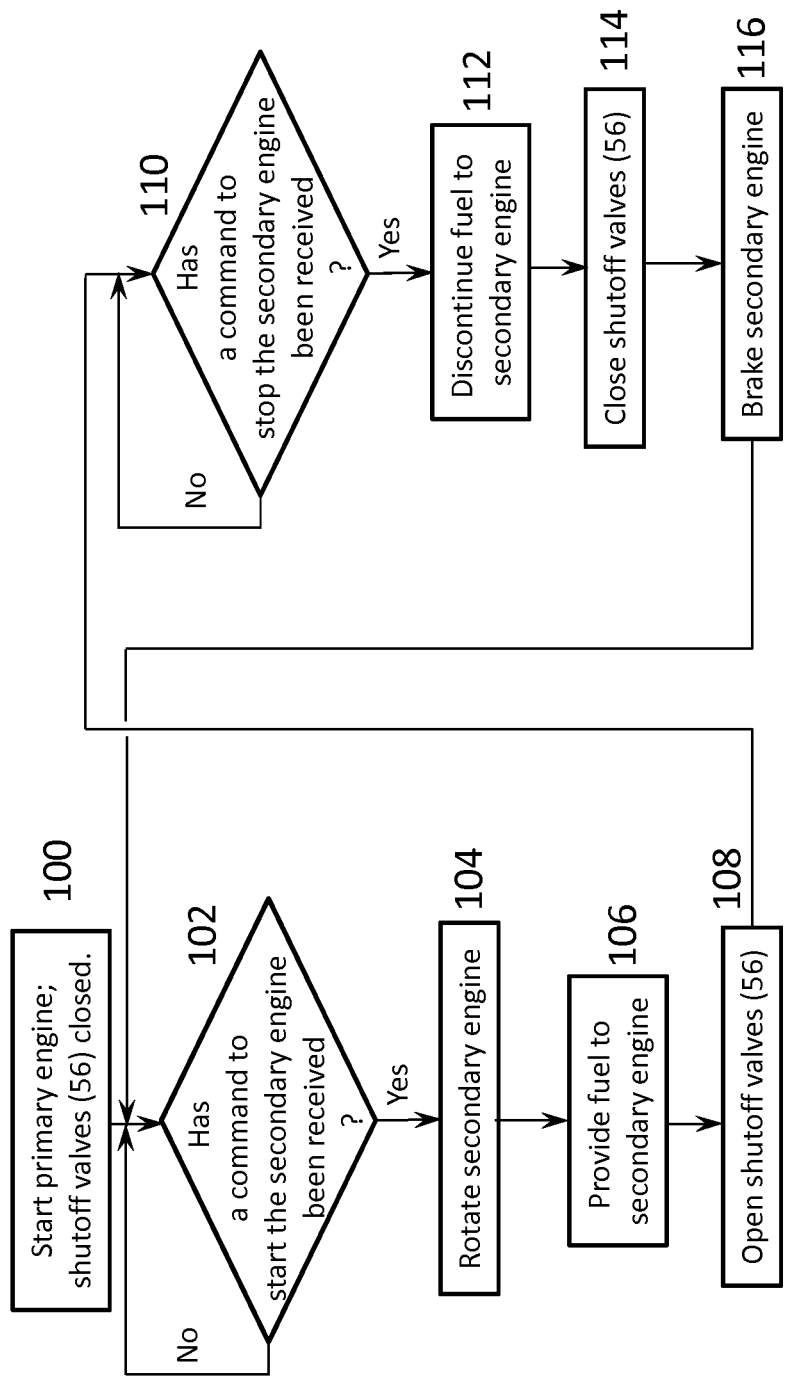

SHARED EGR SYSTEM AND METHOD FOR A DUAL-MODULE ENGINE

CROSS-REFERENCE TO RELATED APPLICATIONS

The present application claims priority benefit from U.S. provisional patent application 61/576,057 filed 15 Dec. 2011.

FIELD

The present disclosure relates to EGR and aftertreatment systems for an engine system having multiple engines and to methods for controlling the same.

BACKGROUND

An engine system that includes two internal combustion engines has the potential for providing superior fuel economy. When torque demand is low, only one of the two engines is operated. However, high torque demand can be satisfied by operating both engines. One challenge is to avoid complete duplication of all the engine accessories.

SUMMARY

An internal combustion engine system is disclosed that has both a first internal combustion engine and a second internal combustion engine. The system further includes a first exhaust aftertreatment device disposed in an engine exhaust downstream of the first engine, a second exhaust aftertreatment device disposed in an engine exhaust downstream of the second engine, a first tee disposed downstream of the first exhaust aftertreatment device and a second tee disposed downstream of the second exhaust aftertreatment device. The first tee has a first EGR leg and a first exhaust leg and the second tee has a second EGR leg and a second exhaust leg. An EGR system is fluidly coupled with the first EGR leg and with the second EGR leg. The EGR system includes an EGR cooler and an EGR pump. A first turbocharger having a turbine is disposed in the first exhaust leg. A second turbocharger having a turbine is disposed in the second exhaust leg. First and second outlet ducts are coupled to the EGR system. The first outlet duct is fluidly coupled to an engine intake of the first engine and the second outlet duct is fluidly coupled to an engine intake of the second engine. The first turbocharger further includes a compressor disposed in the engine intake of the first engine and the compressor is located upstream of the location where the first outlet duct fluidly couples to the engine intake of the first engine. The second turbocharger further includes a compressor disposed in the engine intake of the second engine and the compressor is located upstream of the location where the second outlet duct fluidly couples to the engine intake of the second engine.

The system further includes a first shutoff valve located in the second EGR leg and a second shutoff valve disposed in the second outlet duct from the EGR system. The shutoff valves are electronically coupled to an electronic control unit.

In some embodiments, the EGR pump is a positive-displacement pump.

In one embodiment, the first and second aftertreatment devices are first and second diesel oxidation catalysts; alternatively, the first and second aftertreatment devices are first and second diesel particulate filters; and in yet another embodiment, the first and second aftertreatment devices include both diesel oxidation catalysts and diesel particulate filters adjacently to each other. In one embodiment, the diesel oxidation catalysts are immediately upstream of the diesel particulate filter. In another embodiment, the diesel oxidation catalysts are immediately downstream of the diesel particulate filter.

In some embodiments, the turbocharger is provided with an electric machine which is adapted to provide energy to a shaft of the turbocharger and to extract energy from a shaft of the turbocharger.

In some embodiments, the system includes a control mechanism coupled to the EGR pump and an electronic control unit (ECU) coupled to the control mechanism. The control mechanism may be a bypass duct coupling the inlet and the outlet of the EGR pump and a controllable valve disposed in the bypass duct. The EGR pump may be driven directly or indirectly via a crankshaft of one of the engines.

In some embodiments, both of the engines are opposed-piston, opposed-cylinder (OPOC) engines.

A method is disclosed in which it is determined whether there is a command to start the secondary engine. If so, the secondary engine is rotated, fuel is provided to the secondary engine, and the shutoff valves which isolate the secondary engine from a shared EGR system are opened. The method also includes determining whether a demand for stopping the secondary engine has been received. If so, fuel is turned off from the secondary engine and the shutoff valves are closed. The secondary engine can be braked.

BRIEF DESCRIPTION OF THE DRAWINGS

FIG. 2 is a flowchart showing a method to control the system of FIG. 1.

DETAILED DESCRIPTION

Figure 1:
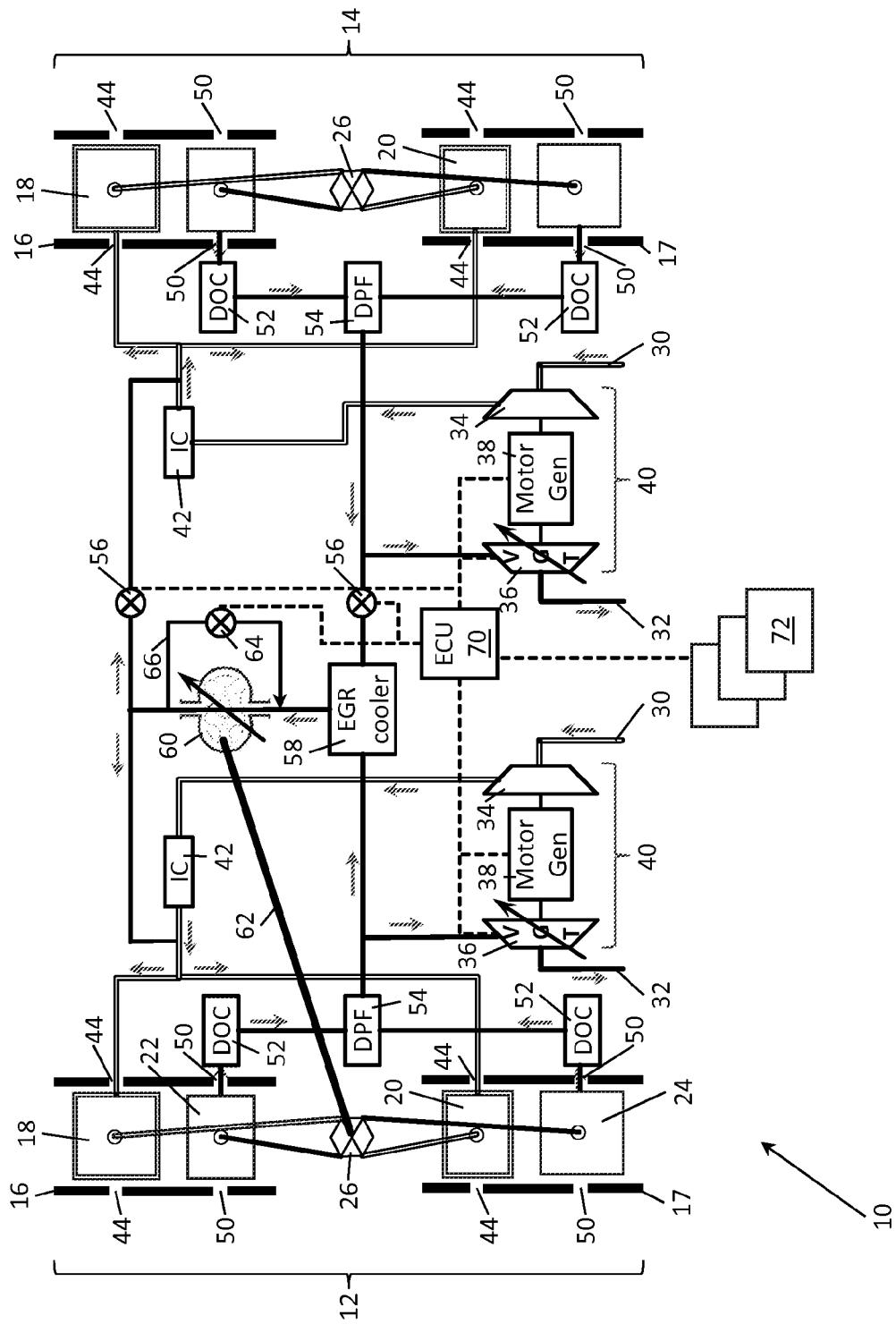
FIG. 1 is a schematic drawing of an aftertreatment system according to an embodiment of the disclosure.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

In FIG. 1 a schematic of a gas exchange system for a dual-module opposed-piston, opposed-cylinder (OPOC) engine system 10 is shown. Engine system 10 has a primary engine 12 and a secondary engine 14. As they are nearly identical, only one of them is described in detail in the following. In the embodiment in FIG. 1, primary and secondary engines are both OPOCs. An OPOC engine is described in U.S. Pat. No. 6,170,443 incorporated herein by reference in its entirety. However, the present disclosure applies to any engine type and also applies to situations in which the primary and secondary engines are not the same type and/or the same displacement. Engine 12 has a cylinder 16 with an outer intake piston 18 and an inner exhaust piston 22 opposed from a cylinder 17 with an inner intake piston 20 and an outer exhaust piston 24. Pistons 18, 20, 22, and 24 couple to a crankshaft 26 by connecting rods. Intake pistons 18 and 20 cover and uncover intake ports 44, and exhaust pistons 22 and 24 cover and uncover exhaust ports 50 during reciprocation of the associated piston.

Engine 12 is provided an electronically-controlled turbocharger (ECT) 40 that has a compressor 34 in an intake duct 30 and a turbine 36 in an exhaust duct 32. Turbine 36 is a VGT type in the embodiment in FIG. 1; but any suitable turbine may be used. ECT 40 has an electric machine 38 to supplement exhaust enthalpy. In one embodiment, the electric machine is a motor/generator which can be operated as a motor to increase the torque on the turbocharger shaft or operated as a generator to absorb torque from the turbocharger; but any suitable electric machine may be used. The intake also has an intercooler (IC) 42 downstream of compressor 34.

The embodiment in FIG. 1 shows a diesel oxidation catalyst (DOC) 52 immediately downstream of exhaust ports 50 from each cylinder 16 and 17 of engine 12. Exhaust from each DOC 52 is fed to a diesel particulate filter (DPF) 54. Some of the gases from DPF 54 are expanded in turbine 36 and some of the exhaust gas stream is recycled to the intake via an EGR system. The EGR system includes an EGR cooler 58 and an EGR pump 60. EGR pump 60 may be a positive-displacement pump or any other suitable pump. EGR pump 60 is driven by crankshaft 26 of primary engine 12 via a driveshaft 62. Alternatively, it may be driven electrically or by any other suitable means. The EGR system is shared between the two engines 12 and 14 to avoid component redundancy. In yet another alternative, EGR pump 60 is located upstream of EGR cooler 58.

Turbine 36 is often located upstream of DPF 54 so any flaking from DPF 54 does not harm the turbine wheel. However, potential for catalyst substrate flaking off and passing through the turbine is largely mitigated by advancements in metal substrates thus allowing the configuration in FIG. 1.

The dual-module engine 10 can be run with only primary engine 12 when low torque is demanded. When secondary engine 14 is not operating, shutoff valves 56 are closed so that secondary engine 14 is isolated from primary engine 12. Valves 56 are commanded to an open position when secondary engine 14 is to be operated. In some embodiments, the primary and secondary engines 12 and 14 are coupled via a clutch (not shown) so that when higher torque is demanded, secondary engine 14 may be started either by a starter motor (not shown) or by bump starting by closing the clutch. Secondary engine 14 then starts and produces torque to supplement that of primary engine 12. In some embodiments, such as in an OPOC engine, shutoff valves may not be provided. In the OPOC engine, when the pistons in one cylinder approach a position where the ports are to be opened, the pistons in the opposite cylinder approach TDC, i.e., a position that requires a lot of force to attain. It is likely that the engine will stop with the pistons in both cylinders in an intermediate position in which no ports are open. If this is always the case, shutoff valves may be eliminated. In embodiments in which the engines are typical 4-stroke, multi-cylinder engines, the engine that is not being operated may stop in a position in which both an intake valve and an exhaust valve, in at least one cylinder, are both open. In such an embodiment, the shutoff valves can prevent exhaust leaking through the engine.

An electronic control unit (ECU) 70 is electronically coupled to a bypass valve 64, shutoff valves 56, electric machines 38, and VGTs 32. ECU 70 receives inputs from various other sensors 72 to determine appropriate control of valves 56, electric machines 38, and VGTs 36. In embodiments in which EGR pump 60 is driven by the crankshaft 26 in which the speed is controlled by engine demand, a bypass valve 64 provides the desired exhaust flow control through a bypass duct 66 thereby controlling the amount of EGR provided to the engine or engines, as the case may be.

FIG. 2 shows a flowchart that illustrates a method according to the present disclosure. In block 100, primary engine 12 is started and the shutoff valves 56 are commanded to close, if not already closed. In block 102, it is determined whether there is a command to start secondary engine 14. It may be determined that secondary engine 14 should be started based on primary engine 12 being unable to produce the demanded torque. Alternatively, secondary engine 14 may be commanded to start based on obtaining lower overall fuel economy or other suitable criteria. If such a command is received in block 102, control passes to block 104, in which secondary engine 14 is caused to rotate. In one embodiment, secondary engine 14 is provided with a starter motor (not shown). In another embodiment, an electronically-controlled clutch (not shown) is provided between the engines 12 and 14. By closing the clutch, secondary engine 14 is bump started. When secondary engine 14 is rotating at a sufficient speed, fuel is provided to secondary engine in block 106. At nearly the same time, shutoff valves 56, which isolate the secondary engine's exhaust from the EGR system, are opened in block 108. At this point, the engine is operating normally on both engines. Control passes to block 110 in which it is determined whether a signal has been received to stop secondary engine 14. The command could be based on a drop in demanded torque, or other suitable criteria. If such a command has been determined, the fuel is discontinued to the secondary engine in block 112; the shutoff valves are closed in block 114; and the secondary engine is braked in block 116. At this point, the engine system is operating normally with just the primary engine and control returns to block 102.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. An internal combustion engine system, comprising:
    a first internal combustion engine;
    a second internal combustion engine;
    a first diesel particulate filter (DPF) disposed in an engine exhaust downstream of the first engine;
    a second DPF disposed in an engine exhaust downstream of the second engine;
    a first tee disposed downstream of the first DPF, the first tee having a first EGR leg and a first exhaust leg;
    a second tee disposed downstream of the second DPF, the second tee having a second EGR leg and a second exhaust leg;
    an EGR system fluidly coupled with the first EGR leg and with the second EGR leg, the EGR system comprising:
        an EGR cooler and an EGR pump;

a first turbocharger having a turbine disposed in the first exhaust leg;
a second turbocharger having a turbine disposed in the second exhaust leg;
a bypass duct fluidly coupling an inlet and an outlet of the EGR pump;
controllable valve disposed in the bypass duct; and
an electronic control unit (ECU) coupled to the controllable valve.

2. The system of claim 1, further comprising: first and second outlet ducts from the EGR system wherein the first outlet duct is fluidly coupled to an engine intake of the first engine and the second outlet duct is fluidly coupled to an engine intake of the second engine.

3. The system of claim 2 wherein:
the first turbocharger further includes a compressor disposed in the engine intake of the first engine and the compressor is located upstream of the location where the first outlet duct fluidly couples to the engine intake of the first engine; and
the second turbocharger further includes a compressor disposed in the engine intake of the second engine and the compressor is located upstream of the location where the second outlet duct fluidly couples to the engine intake of the second engine.

4. The system of claim 2, further comprising:
a first shutoff valve located in the second EGR leg;
a second shutoff valve disposed in the second outlet duct from the EGR system; and
an electronic control unit electronically coupled to the first and second shutoff valves.

5. The system of claim 1 wherein the EGR pump is a positive-displacement pump.

6. The system of claim 1, further comprising:
a first diesel oxidation catalyst (DOC) disposed in the engine exhaust of the first engine and located upstream of the first DPF; and
a second DOC disposed in the engine exhaust of the second engine and located upstream of the second DPF.

7. A method to control a dual-engine system having a primary engine and a secondary engine, the method comprising:
determining whether a demand for starting the secondary engine has occurred;
conducting the following in response to the determination that starting of the secondary engine has been demanded:
rotating the secondary engine;
providing fuel to the secondary engine; and
opening shutoff valves which isolate the secondary engine from a shared EGR system;
determining whether a demand for stopping the secondary engine has occurred:
conducting the following in response to the determination that stopping of the secondary engine has been demanded:
turning off fuel to the secondary engine; and
closing shutoff valves to isolate the secondary engine from a shared EGR system wherein the shared EGR system comprises an EGR pump and a bypass duct fluidly coupling an inlet and an outlet of the EGR pump and a controllable valve disposed in the bypass duct.

8. The method of claim 7 wherein in response to the determination that stopping of the secondary engine has been demanded, the following is further conducted: braking the secondary engine.

9. The method of claim 7 wherein the dual-engine system further includes:
at least a first aftertreatment device disposed in an engine exhaust downstream of the primary engine;
at least a second aftertreatment device disposed in an engine exhaust downstream of the secondary engine;
a first tee disposed downstream of the first aftertreatment device, the first tee having a first EGR leg and a first exhaust leg;
a second tee disposed downstream of the second aftertreatment device, the second tee having a second EGR leg and a second exhaust leg; and
an EGR system fluidly coupled with the first EGR leg and with the second EGR leg, the EGR system further comprising: an EGR cooler.

10. The method of claim 9 wherein the dual-engine system further includes:
a first turbocharger having a turbine disposed in the first exhaust leg and a compressor disposed in an engine intake of the primary engine; and
a second turbocharger having a turbine disposed in the second exhaust leg and a compressor disposed in an engine intake of the secondary engine.

11. An internal combustion engine system, comprising:
a first internal combustion engine;
a second internal combustion engine;
a first diesel oxidation catalyst (DOC) disposed in an engine exhaust downstream of the first engine;
a second DOC disposed in an engine exhaust downstream of the second engine;
a first tee disposed downstream of the first DOC, the first tee having a first EGR leg and a first exhaust leg;
a second tee disposed downstream of the second DOC, the second tee having a second EGR leg and a second exhaust leg;
an EGR system fluidly coupled with the first EGR leg and with the second EGR leg, the EGR system comprising:
an EGR pump;
a first turbocharger having a turbine disposed in the first exhaust leg; and
a second turbocharger having a turbine disposed in the second exhaust leg wherein a driveshaft of the EGR pump is driven by a crankshaft of the primary engine.

12. The system of claim 11, further comprising: first and second outlet ducts from the EGR system wherein the first outlet duct is fluidly coupled to an engine intake of the first engine and the second outlet duct is fluidly coupled to an engine intake of the second engine.

13. The system of claim 12 wherein:
the first turbocharger further includes a compressor disposed in the engine intake of the first engine and the compressor is located upstream of the location where the first outlet duct fluidly couples to the engine intake of the first engine; and
the second turbocharger further includes a compressor disposed in the engine intake of the second engine and the compressor is located upstream of the location where the second outlet duct fluidly couples to the engine intake of the second engine.

14. The system of claim 12, further comprising:
a first shutoff valve located in the second EGR leg;
a second shutoff valve disposed in the second outlet duct from the EGR system; and
an electronic control unit electronically coupled to the first and second shutoff valves.

15. The system of claim 11 wherein the first and second engines are OPOC engines.

16. The system of claim 11, further comprising:
a first diesel particulate filter (DPF) disposed in the engine exhaust of the first engine immediately adjacent to the first DOC; and
a second DPF disposed in an engine exhaust of the second engine immediately adjacent to the second DOC.

17. The system of claim 11, further comprising:
a bypass duct fluidly coupling an inlet of the EGR pump with an outlet of the EGR pump;
a controllable valve disposed in the bypass duct; and
an electronic control unit electronically coupled to the controllable valve.

* * * * *